United States Patent [19]
Golden et al.

[11] Patent Number: 5,367,652
[45] Date of Patent: Nov. 22, 1994

[54] DISC DRIVE TRANSLATION AND DEFECT MANAGEMENT APPARATUS AND METHOD

[76] Inventors: Jeffrey A. Golden, 1125 Blue Ridge Rd., Boulder Creek, Calif. 95006; Karl D. Schuh, 111 Dean Creek Rd. #34, Scotts Valley, Calif. 95066-4136

[21] Appl. No.: 474,474
[22] Filed: Feb. 2, 1990
[51] Int. Cl.⁵ .................. G11B 15/18; G06F 3/06
[52] U.S. Cl. .................. 395/499; 360/72.1; 372/10.2
[58] Field of Search .................. 395/400, 425; 364/200 MS File, 900 MS File; 360/72.1, 72.2; 369/32, 30; 371/10.1, 10.2, 37.8, 40.1

[56] References Cited

U.S. PATENT DOCUMENTS

| | | | |
|---|---|---|---|
| 4,434,487 | 2/1984 | Rubinson et al. | 371/10.1 |
| 4,498,146 | 2/1985 | Martinez | 395/425 |
| 4,536,837 | 8/1985 | Olson et al. | 395/600 |
| 4,742,447 | 5/1988 | Duvall et al. | 395/375 |
| 4,903,198 | 2/1990 | Iwasaki | 395/575 |
| 4,924,331 | 5/1990 | Robinson et al. | 360/72.1 |
| 5,040,110 | 8/1991 | Miki et al. | 395/600 |
| 5,113,512 | 5/1992 | Miki et al. | 365/425 |

*Primary Examiner*—Joseph L. Dixon
*Assistant Examiner*—Jack A. Lane

[57] ABSTRACT

A disc drive translation and defect management method and apparatus. The method and apparatus includes an index table to translate a host computer's logical cylinder request into an arbitrarily designated physical cylinder location in the disc drive system. Once the physical cylinder is located, the physical head and sector location is determined with a quick, relatively simple mathematical translation. If a defect is present on the indexed physical cylinder in question, the index table provides a defect flag and a pointer which points into a predetermined entry of a defect table. The selected entry in the defect table provides a defect offset value for the physical location in question. The offset value is added to the physical cylinder, head and sector location to push it into a defect-free physical location.

16 Claims, 5 Drawing Sheets

TARGET CYLINDER ADDRESS INFORMATION

| LOGICAL CYL | $CYL_{PO}$ | $HD_{PO}$ | $SCR_{PO}$ | N | Z | I |
|---|---|---|---|---|---|---|
| 0 | 0 | 0 | 0 | 0 | 0 | 0 |
| 1 | 1 | 0 | 2 | 0 | 0 | 1 |
| 2 | 2 | 1 | 0 | 0 | 0 | 3 |
| 3 | 4 | 0 | 0 | 1 | 1 | Z |
| 4 | 5 | 0 | 2 | 1 | 1 | Z |
| 5 | 7 | 0 | 0 | 0 | 1 | 4 |
| 6 | 8 | 1 | 0 | 1 | 1 | Z |
| 7 | 9 | 2 | 10 | 0 | 1 | 5 |
| 8 | 11 | 3 | 0 | 0 | 1 | 6 |
| 9 | 13 | 0 | 20 | 1 | 1 | Z |

FIG. 4

INDEX TABLE

| I | PUSH COUNT | | | Z | L | TARGET SCR |
|---|---|---|---|---|---|---|
| | $CYL_D$ | $HD_D$ | $SCR_D$ | | | |
| 0 | 0 | 0 | 1 | 0 | 0 | 2 |
| | 0 | 0 | 2 | 0 | 0 | 10 |
| | 0 | 0 | 3 | 0 | 1 | 20 |
| 1 | 0 | 0 | 1 | 0 | 0 | 5 |
| | 0 | 0 | 5 | 0 | 0 | 12 |
| | 0 | 0 | 6 | 0 | 0 | 18 |
| | 0 | 1 | 0 | 0 | 1 | 25 |
| 6 | 1 | 1 | 5 | 1 | 0 | 4 |
| | 1 | 1 | 7 | 1 | 0 | 13 |
| | 1 | 1 | 8 | 1 | 1 | 35 |

DISC DRIVE TRANSLATION AND DEFECT MANAGEMENT APPARATUS AND METHOD

FIELD OF THE INVENTION

The present invention relates generally to a disc drive translation and a defect management method and apparatus. More particularly, the present invention relates to a disc drive translation and defect management scheme which provides an index table which is used for high speed translations of logical cylinder requests into physical target cylinders on the disc. The scheme also provides a pointer into a defect table if there is a defect present in the target cylinder in question. In this case, the defect table provides an offset value to push the target physical cylinder into a new, defect-free physical location.

BACKGROUND OF THE INVENTION

Figures 1, 2:
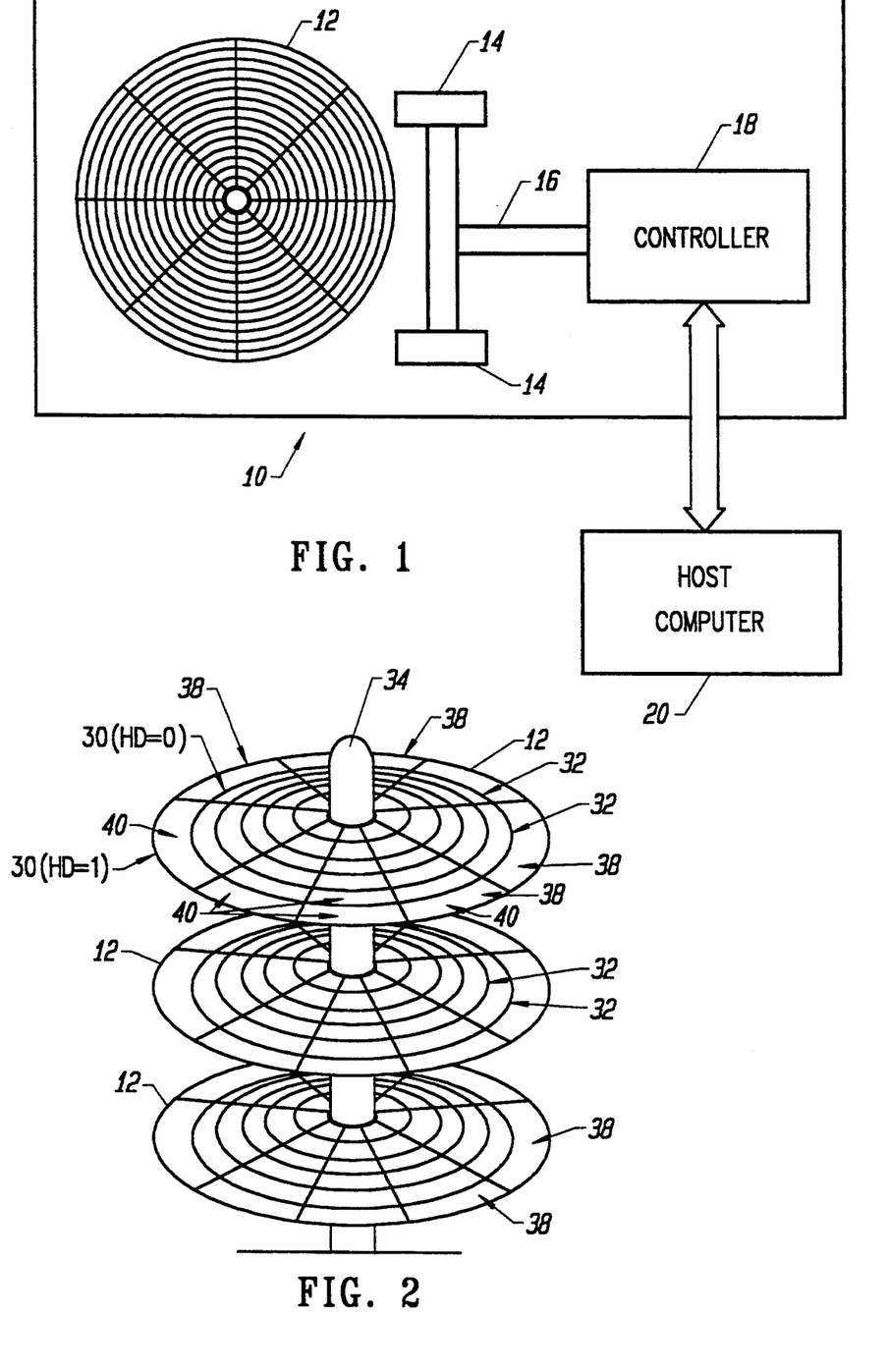
FIG. 1 is a block diagram of a standard disc drive system according to the prior art.
FIG. 2 is an isolated perspective view of several of the discs of the disc drive system of FIG. 1.

Computer systems rely on disc driven magnetic memory, among other devices, for data storage. Referring now to FIG. 1, a block diagram of a standard disc drive system is shown. Disc drive storage system 10 includes: one or more magnetic discs 12, one or more magnetic read, write heads 14; and a seek mechanism 16 to physically move the heads 14 over the discs. A controller 18 manages information transfer between the storage discs and host computer system 20 by controlling seek mechanism 16.

Briefly describing the operation of disc drive system, host computer 20 provides logical instructions to the disc drive to access or store information on individual physical memory locations on the discs. Information on the disc drive, however, is not stored in a logical format. A logical format would sequentially read or store data without considering the possibility of defective storage areas on the disc. Therefore, the controller is required to translate the logical request from the controller into a corresponding physical target location on one of the discs. Once the translation is performed, the controller manipulates seek mechanism 16 to direct heads 14 to the physical target location, whereupon the heads will read or store information.

Referring now to FIG. 2, an isolated perspective view of several magnetic discs 12 of disc drive system 10 is shown. The purpose of illustrating the discs is to illustrate how information is physically organized and stored on the discs, which is essential for the understanding of the invention. Each side of a disc 12 is called a data storage surface 30, and there are two surfaces per disc (HD=0), (HD=1). Each surface 30 comprises a plurality of concentric circles called tracks 32. The outermost track is generally designated as the first logical track (track=0) and the innermost track is designated as the last track (i.e. track=999 in a one thousand track disc drive system). The individual discs 12 are journalled about a single spindle 34 and are physically stacked one above the other. The combination of like track 32 numbers on each surface forms what is called a cylinder.

Each surface is also divided up into a certain number of pie-shaped sectors 38. The plurality of areas created by the sectors 38 and tracks 32 form individual storage locations called segments 40. Each segment is capable of storing 512 bytes of information. Each segment 40 is accessed by a three coordinate address corresponding to the cylinder number, the head number and the sector number.

In the early magnetic disc storage devices, the standard disc drive contained 17 sectors per track. More recently, due to advances in disc drive technology, the same 512 bytes of information can be stored in a smaller physical location. The number of sectors per track has therefore increased, and the current state-of-the-art is 26 sectors per track. Using special data access techniques the number of sectors per track can be expanded to as many as 44.

Controller 18 is responsible for translating a logical request from a host computer into the correct target physical segment 40 on the disc drive. Each logical request includes a logical cylinder, head and sector which must be translated into target physical cylinder, head and sector.

The translation, however, is complicated by several factors. Most computers 20 still operate on the old 17 sector standard, and hence, their logical requests are in 17 sector format. On the contrary, modern disc drives contain a varying number of sectors per track up to 26 sectors. Accordingly, as will be described in the example below, a mathematical translation from a logical 17 sector format to a physical 26 sector format is required.

A second factor which complicates the translation is that host 20 considers the disc drive to be a defect free block of memory. On the contrary, defective segments are intermittently spaced throughout the physical disc media. A defect management scheme is therefore required.

To describe the operation of the prior art two-step translation and defect management scheme, an example is provided. A two-step process is required for a complete logical to physical translation. The two steps include:

1. Calculating the logical to physical location translation using well known mathematical translation algorithms.
2. Adjusting the target physical translation to compensate for known physical defects which exist in the disc drive.

Consider a three head, 26 sector per track drive controlled by a host using a 4 head, 17 sector per track format. The host sends a request to controller 18 for logical cylinder number (1), head number (3), and sector number (16). The first step in the mathematical translation is to convert a logical request into an intermediate segment number of 135. This number is derived by multiplying the requested cylinder number (1) times the number of heads per cylinder (3) times the number of sectors per track (17) plus the head request number (3) times the number of sectors per track (17) plus the sector request (16). $(1 \times 4 \times 17) + (3 \times 17) + 16 = 135$. The previous calculation is much like the calculation to convert a base 17 number into a base 10 number. Next the base 10 number must be translated into a base 26 address.

The intermediate number (135) is then translated into a target physical segment in the 26 sector disc drive system. In the three head and 26 sectors per track disc drive configuration, there are 78 segments per cylinder. With an intermediate segment number of 135, one cylinder is completely used up with 57 segments remaining $(135-78=57)$. Two complete tracks $(2 \times 26=52)$ can be completely inserted into the remainder, with a remainder of 5 sectors. Accordingly, the target translation results in an physical segment addressed by:

cylinder=1,
head=2, and
sector=5.

In the second step, the target physical segment address is adjusted to compensate for physical defects which occur on the disc prior to the above physical target segment location. Prior to discussing two common techniques for compensating for defects, it is first necessary to briefly describe how physical defects are detected on the disc's surface. The disc drive manufacturer writes information on every segment 40 on the disc and then reads back that information. Segments that information cannot be read from are marked as defective. The locations of all the defects are recorded and mapped out of the physical disc so they are not accessed during actual disc drive operations.

Two popular methods of mapping out defects are described below. In the first method, a physical track is first marked out on the disc. The track must be large enough to accommodate the total number of segments per track (i.e. 26) plus the allocation of several spares. The sectors are then mapped consecutively, starting with 1 and ascending in order to the last sector number (26) within the track. Whenever a physical defect occurs in the track, it is simply remapped into a spare area at the end of the track.

Figure 6:
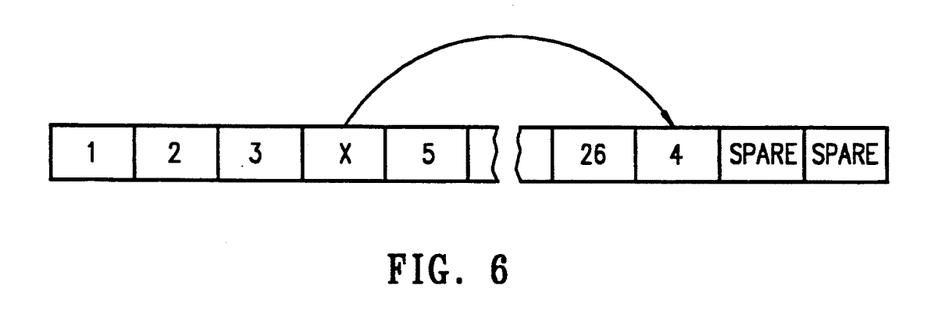
FIGS. 6 and 7 illustrate prior art approaches to the problem solved by this invention.

Referring to the illustrative table of FIG. 6 used to describe the first defect management scheme, a 26 sector track is shown. The segment numbers ascend in linear order from one through three, until segment number four is encountered. In the fourth segment, an "X" appears signifying that a physical defect is present. In the mapping scheme described above, the fourth segment is simply remapped, as illustrated by the arrow in the diagram below, into a spare segment at the end of the track.

In a second defect management scheme according to the prior art, the solution for accommodating physical defects that occur in a track is to simply skip them and to increment the remaining segments into the next location. Each time a defect occurs, as a consequence, the last segment on the map is pushed into a spare segment.

Figure 7:
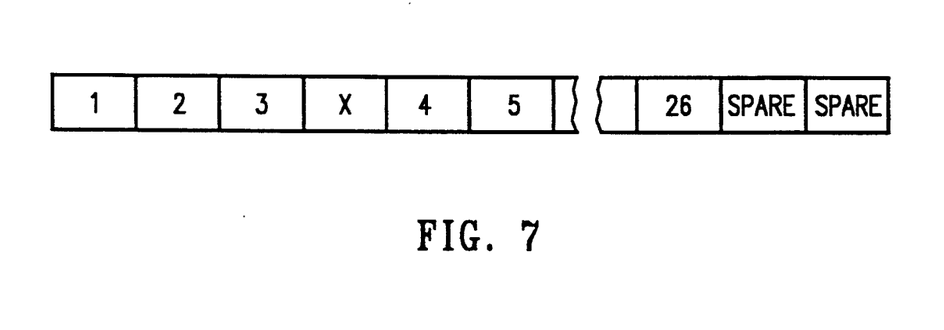

Referring now to the illustrative table of FIG. 7 used to describe the second prior art defect management scheme, a simplified 26-sector track is shown. The defect at segment 4, identified by the X, is pushed into the next segment. As a result, the subsequent segment numbers 5 through 26 are incremented so that the 26th sector is a logical location to the physical location, the absolute physical translations must be incremented by a push count which is equal to the accumulated number of bad sectors which occur before the requested logical sector.

A number of problems are associated with the translation and defect management schemes of the prior art as described above. Foremost, the time required to mathematically translate is excessive. It is a slow and tedious process for the disc drive controller to perform the aforementioned absolute physical location. The checks required to keep track of the defects also slow down the computations significantly. Approximately two to five milliseconds are required for each translation. The accumulated effect of these translations seriously impedes information transfer time between disc drive 10 and host 20.

Another problem with the prior art is that it fails to make efficient use of the physical space on the disc drive media. Even with twenty-six sectors per track, a large percentage of the magnetic storage surface remains unused. The segments contained in the innermost tracks are physically shorter than their counterparts situated near the outer circumference of the disc. The information storage density per segment in the inner tracks is therefore relatively high, and is an efficient use of space. In contrast, the density at the outer segments is relatively low, and is an inefficient use of space. As a result, a substantial percentage of the physical storage medium located near the outer circumferences of the disc is unused.

SUMMARY OF THE INVENTION

An object of the present invention is to provide a disc drive translation and defect management scheme which significantly reduces access time to any storage location.

Another object of the invention is to provide a disc drive management scheme which permits the arbitrary arrangement of target physical cylinders in the disc drive system.

Another object of the invention is to provide a disc drive management scheme which significantly increases the percentage of physical disc space that is actually used for information storage by dividing the physical area of the discs into several zones, and varying the number of sectors per track in each zone.

Another object of the present invention is to provide a disc drive translation and defect management scheme which provides an index table which is used for high speed translations of logical cylinder requests into physical target cylinders on the disc, and also provides a pointer into a defect table if there is a defect present at the target physical disc location. In this case, the defect table provides an offset value to push the target physical cylinder into a new, defect-free physical location to allow direct access of this new location.

To achieve the foregoing and other objects of the invention and in accordance with the purpose of the disc drive translation and defect management scheme, there is provided a method for accessing a physical memory location in a disc drive system, the system having a controller, at least one magnetic storage disc having a plurality of physical memory locations, the individual locations being accessed by cylinder, head and sector numbers, and at least one magnetic head for accessing the physical memory locations, the method comprising the steps of storing in the controller an index table containing a set of logical cylinder memory location entries, wherein each said logical cylinder entry in said index table corresponds to a physical cylinder arbitrarily located in said disc drive system; transmitting from a host computer a request, including a logical cylinder, a logical head and sector, to the controller to access a specific, physical memory location defined by a physical cylinder, head and sector in the disc drive system identifying said specific logical cylinder in said index table, and by virtue of said identification, pointing to said corresponding physical cylinder arbitrarily located in said disc drive system translating said logical head and sector into respectively a physical head and sector within said pointed to physical cylinder; and seeking said magnetic head to said physical cylinder, head and sector to facilitate information transfer between said physical memory location arbitrarily located in the disc drive system and the host computer.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF A PREFERRED EMBODIMENT

Figure 3:
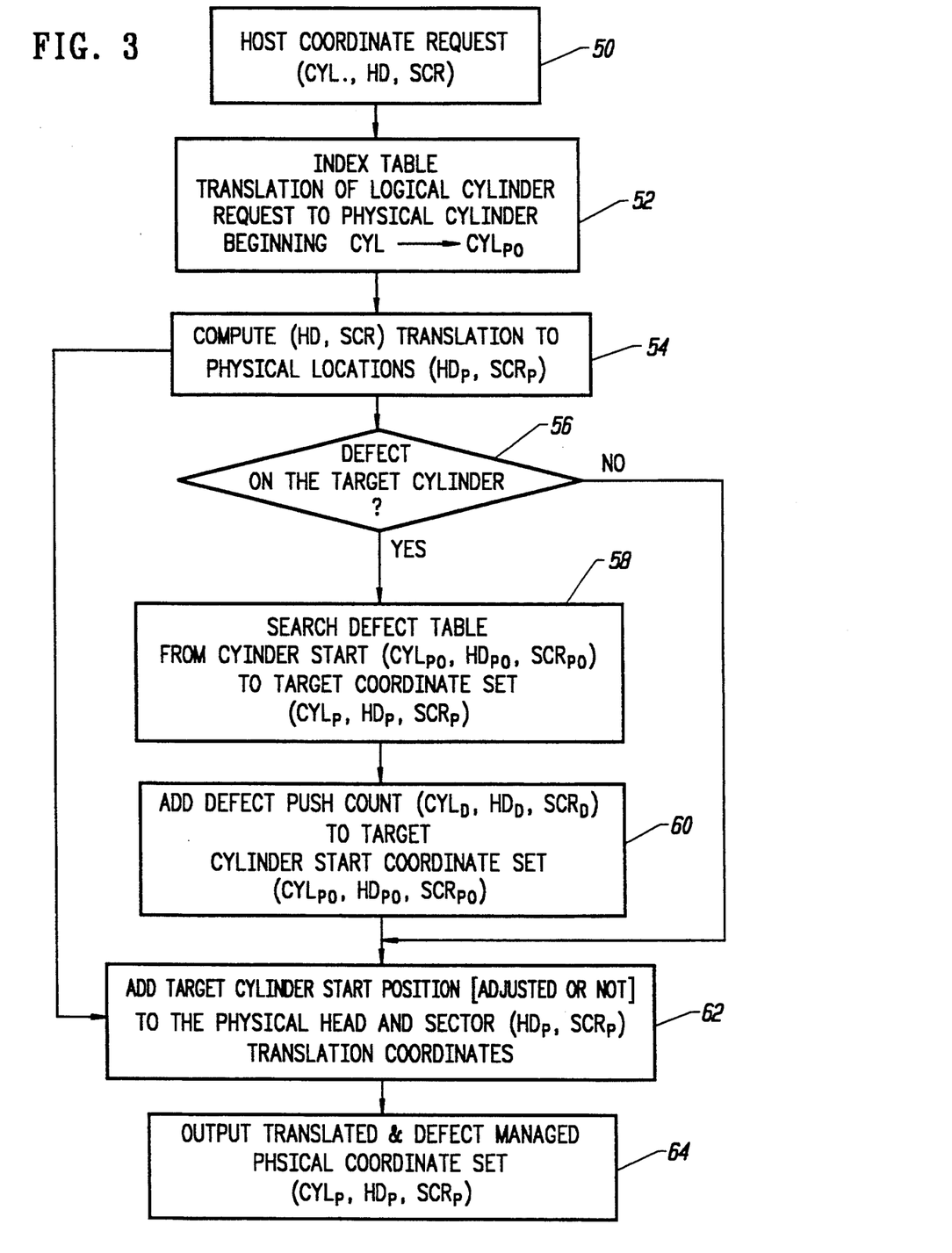
FIG. 3 is a flowchart depicting the method according to the present invention.

The present invention, summarized in the flow chart in FIG. 3, relates to a disc drive translation and defect management method and apparatus, wherein the disc drive controller uses an index table to translate a host computer's logical cylinder request 50 onto a corresponding arbitrarily designated beginning of a physical target cylinder location 52 in the disc drive system. Once the physical cylinder is located, the physical head and sector location is determined with a quick, relatively simple mathematical translation 54.

Figure 4:
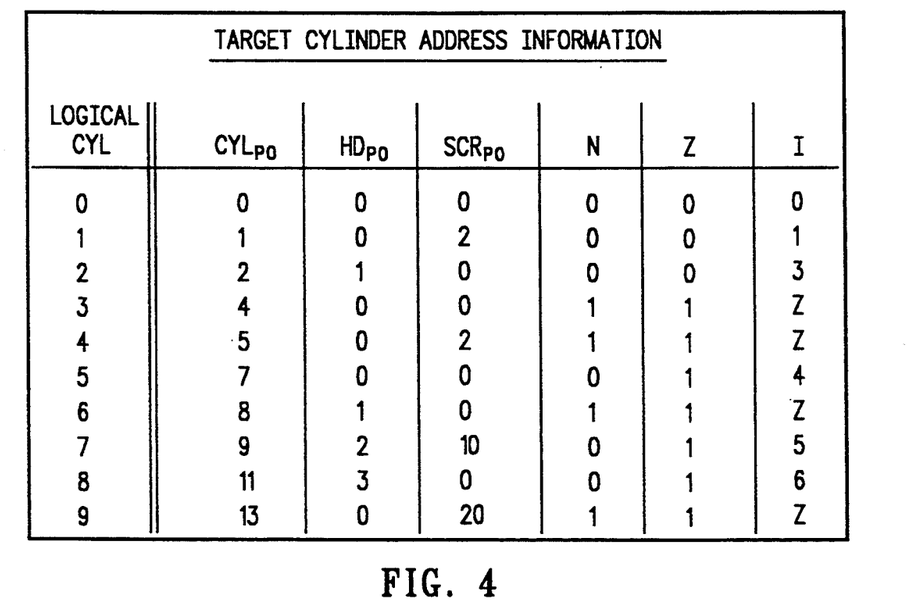
FIG. 4 is an index table used for high speed logical to physical target cylinder translations according to the present invention.

If a defect is present in the indexed physical target cylinder, the index table provides a defect flag to inform the controller of the existence of the defect 56 and a pointer which points into a predetermined entry into a defect table 58. The selected entry in the defect table provides a defect offset value for the physical location in question. The offset value is added to the start coordinates of the physical cylinder, head and sector location 60 to push it into a defect-free physical location. The adjusted or unadjusted value (depending on whether a defect existed in the designated cylinder start position) is added to the computed translation of the physical head and sector locations 62 resulting in the translated and defect management adjusted physical coordinate set 64. The net result of the present invention is that it significantly reduces information access time, permits arbitrary arrangement of individual physical cylinders on a disc, and significantly increases the percentage of physical space used for information storage. Referring now to FIG. 4, an index table used for high speed logical to physical target cylinder translations according to the present invention is shown. This table is stored in memory associated with a servo processor within the disc drive controller 18, and is accessed for each seek to a memory location ordered by the host computer 20. The logical cylinder coordinate requested by the host computer is used to access each entry in the index table. The logical head and sector coordinates are used later in a mathematical equation to refine the target cylinder start coordinate set defined by the index table.

The first entry is labeled as logical cylinder 0, and the last entry corresponds to the last logical cylinder accessible in the disc drive. For the purposes of simplification, the index table of FIG. 4 contains only 10 logical cylinder entries numbered 0 through 9. It should be noted, however, that the index table can be adapted to operate with any disc drive system.

Each table entry includes four bytes of data to store the aforementioned physical information. The four types of information include:

Byte 0 = [HD, HD, HD, HD, N, C, C, C]

Byte 1 = [C, C, C, C, C, C, C, C]

Byte 2 = [I, SR, SR, SR, SR, SR, SR, SR]

Byte 3 = [I, I, I/Z, I/Z, I/Z, I/Z, I/Z, I/Z]

wherein:
HD = the physical head location bit
N = a defect flag bit
C = the physical cylinder location bit
SR = the physical sector location bit
I = the bit for indexing into defect table, or
Z = zone bit (number of sectors/cylinder)

The parameters of (C), head (HD) and sector (SR) for each table entry provide a pointer to a designated start of the target physical cylinder which corresponds to the requested logical cylinder. Because the start of a target physical cylinder may be arbitrarily designated anywhere in the disc drive system, the translation scheme of the present invention offers disc space access and structuring freedom which was previously not realizable.

The "N" bit is a defect flag. If no defects are present in the target physical cylinder, the defect flag is set to (N=1). With no defects in the cylinder, byte 3 contains zone information. Different values of "Z" inform controller 18 of the number of sectors per cylinder, which may vary from zone to zone. A zone consists of one or more cylinders which have the same number of sectors per cylinder. The zone content is important in mathematically translating the logical head and sector coordinates, based on 17 sectors per track, into the physical head and sector coordinates which under the present invention have a variable sector basis depending upon the zone. The present invention translates the head and sector coordinates in the same manner as was previously described concerning the prior art. To summarize, the coordinates based on 17 sectors per track are translated into a base 10 intermediate number which is subsequently translated into a coordinate set based on the actual sectors per track contained in the particular zone of interest.

Note that the index table only provides the logical physical cylinder's start location that corresponds to the hosts requested coordinate set. The remaining two requested coordinates are translated mathematically as described above. If no defects exist on the designated physical cylinder, the mathematically translated coordinates are added to the logical physical cylinder's start coordinates providing a complete set of translated coordinates defining the target physical location. However, if the defect bit is set to (N=0) indicating that a defect exists on the physical cylinder, byte 3 contains a pointer "I" into the defect table of FIG. 5.

The indexing arrangement, as described above, provides several advantages over the prior art. The index table look-up and calculation takes less than 200 microseconds, and represents a significant time reduction in the translation and pre-seek controller overhead. Current disc drive manufacturing technology has reduced the number of defects present on a typical disc to an average of one defect per four tracks. Accordingly, the indexing scheme as described above is used approximately 75% of the time, which means that three out of four of the logical to physical translations occur in less than 200 microseconds. The reduction in time is due mainly to the elimination of the complicated mathematical computations required for translating the logical cylinder number into a physical cylinder location through the use of the index table.

Figure 5:
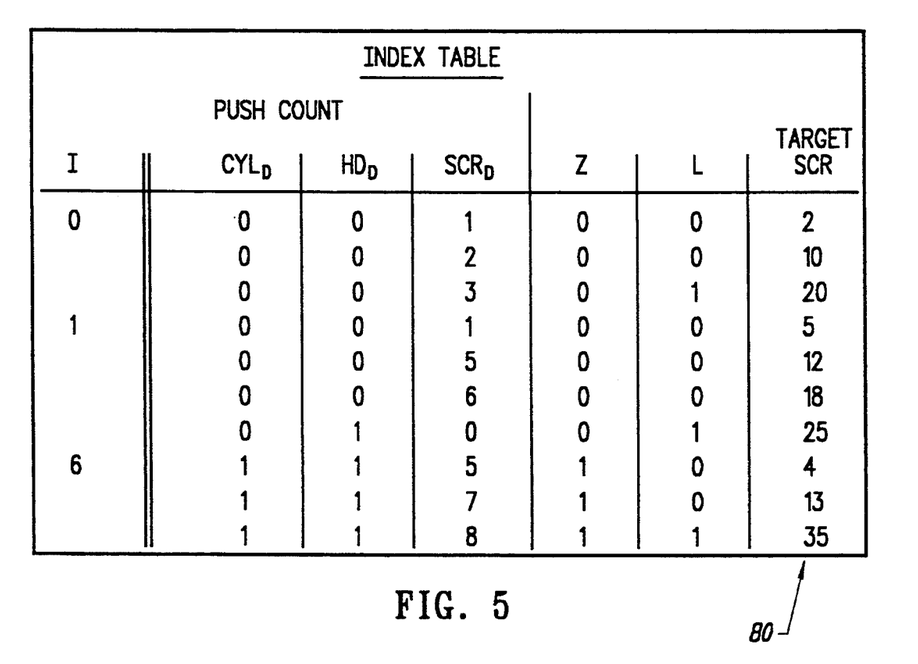
FIG. 5 is a defect table which is accessed by the index table of FIG. 4 if a defect exists in the indexed physical target cylinder according to the present invention.

Referring now to FIG. 5, the defect table is shown. The defect table is accessed by the index table of FIG. 4 if a defect exists in the indexed physical target cylinder. Defect table 80 includes four bytes of memory for storing the following information:

byte 0 = [t7, t6, t5, t4, t3, t2, t1, t0], byte 1 = [t8, z0, z6, z5, z4, z3, z2, z1, z0], byte 2 = [h3, h2, h1, h0, c3, c2, c1, c0], byte 3 = [r7, s6, s5, s4, s3, s2, s1, s0], wherein:
t = the bit for indicating target physical sector on cylinder,
c = cylinder push count bit,
h = head push count bit,
s = sector push count bit,
L = the bit for indicating last defect on this cylinder,
z = zone bit (number of sector/cylinder, and
r = reserved bit.

The I byte in each entry of the index table provides the index information for each entry in the defect table. Within the defect table 80 the cylinder push count (c), head push count (h) and sector push count (s) represent the push or offset value for a single target physical cylinder entry in the defect table, and not the accumulated number of defects for the entire drive. The (L) bit in the defect table is used to delineate the last defect on the target physical cylinder. The zone (z) bit provides the number of sectors per cylinder.

To implement the disc drive translation and defect management scheme of the present invention, it is first necessary to construct the index and defect tables. The index and defect tables are constructed at the disc drive factory. The tables are then stored in microcode, and are loaded into the disc drive system when booted up.

Each defect is discovered by filling the disc drive with data and then attempting to read the data stored in each segment. A listing or map is constructed that lists every possible coordinate set; cylinder number, head number and sector, and designates which addresses are defective. This listing is called a sector map.

The sector map is used to construct both the index table and the defect table. Disc drive designers use the sector map to determine the best layout of start and stop locations for each cylinder. Cylinders may be designated, such that, large blocks of defects may fall between cylinders. Consequently, these areas would never be accessed by the disc drive. Each designated physical cylinder start position is tabulated with the host's logical cylinder designation to create the index table. FIG. 4 is an example of an index table.

The disc drive designers complete the index table by adding the defect designator bit, the zone designator bit, and the defect table pointer address, if necessary.

The defect table is constructed by listing the number of defects per physical cylinder. Defects are accumulated by sequentially adding them as the cylinder is searched. As the defects are added, a push count is generated and maintained. The push count is an address offset, usually designated by a three coordinate set: cylinder push count $CYL_D$ (as shown in FIG. 5), head push count $HD_D$ (as shown in FIG. 5), and sector push count $SCR_D$ (as shown in FIG. 5). This push count is added to the requested address to move, or push, the address to a new, non-defective sector. The defect pointer designates the first defect in the defect table corresponding to the particular cylinder in question. A series of defects is entered into the table as a single entry with the push count incremented by the number of errors in the series. The table is then searched until either the target sector (SCR) is reached in the search or the last defect on this cylinder flag (L) is detected. In either case, the push count up to that point is added to the physical cylinder start position providing an adjusted start position which when added to the calculated target head and sector coordinates will result in an error free address.

Each physical cylinder has a corresponding defect table, unless no errors exist in a cylinder. A defect table search adds approximately 50 microseconds per defect to a translation time. Typically, a worse case overhead for searching a physical cylinder with six discrete defects is less than 500 microseconds.

Figure 8:
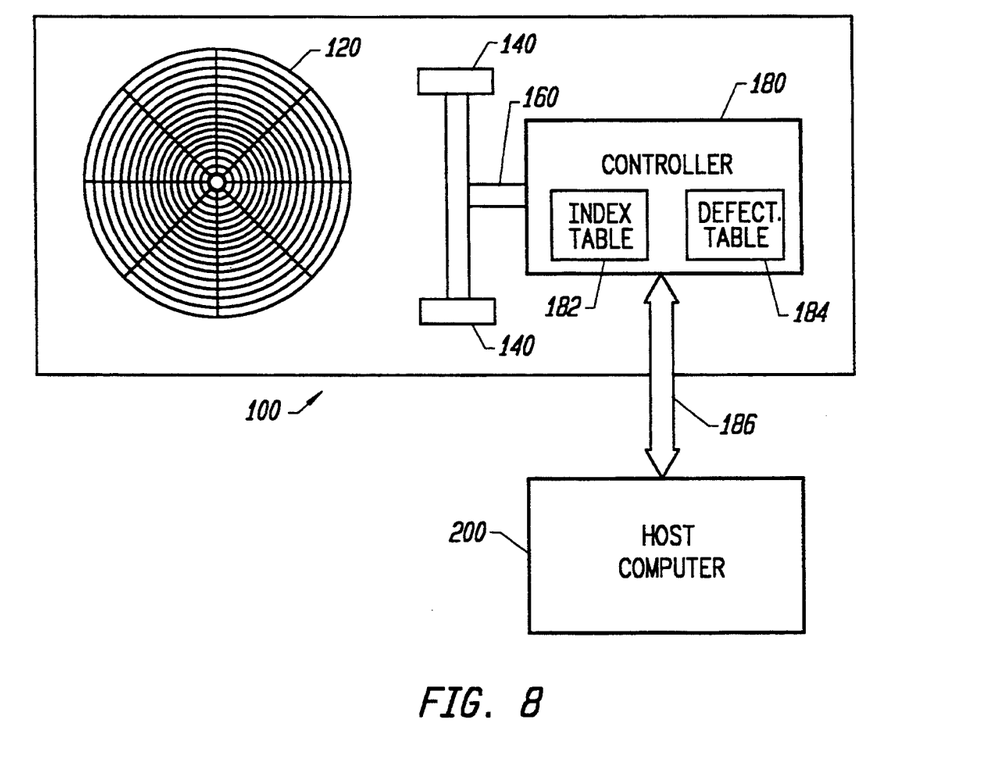
FIG. 8 is block diagram of the disc drive system according to the present invention.

Referring now to FIG. 8, a block diagram of the disc drive system according to the present invention is shown. Disc drive storage system 100 includes: one or more magnetic discs 120, one or more magnetic read, write heads 140; and a seek mechanism 160 to physically move the heads 140 over the discs. A controller 180 including index table 182 and defect table 184 manages information transfer between the storage discs and host computer system 200 over bus 186 by controlling seek mechanism 160.

The disc drive translation and defect management scheme of the present invention provides numerous advantages for information storage in disc drive systems. The main advantage is a significant reduction of translation time. With the target locations stored in the index table, the mathematical steps required to calculate the target physical cylinder are no longer necessary. Furthermore, no matter how many physical defects occur before a target physical location, it is not necessary for controller 18 to perform any defect management computations because they have been pre-computed in advance. Accordingly, the present invention reduces computation time to approximately 10 percent of prior art methods.

Another significant advantage of the translation and defect management scheme of the present invention is its flexibility in mapping the disc drive. The index table can be constructed so that any logical cylinder number can be translated into an arbitrary physical location designated anywhere on the disc drive system. For instance, it is advantageous to place the physical cylinder location corresponding to logical cylinder 000 in the middle of the disc. This is accomplished by constructing the index table so that when the logical cylinder 000 is called, the index table directs controller 18 to the physical location in the middle of the disc. The advantage of mapping the logical cylinder 000 into the center of the disc drive is that it reduces the average head 14 access time in half.

Yet another advantage of the disc drive translation and defect management scheme is the ability for an end user to modify the disc drive into different configurations. By adjusting the number of entries in the index table, the number of physical cylinder and heads in a disc drive can be altered. For example, a 700 cylinder two head disc drive can be altered into a 500 cylinder three head disc drive. This is accomplished by reducing the number of entries in the index table from 700 to 500, and adjusting the physical head information (h3, h2, h1, h0) stored in byte 0 of the index table to reflect a change from two to three heads.

Yet another advantage of the disc drive translation and defect management scheme of the present invention is its ability to efficiently handle a large number of defects which may occur in a disc drive system. The defect management scheme of the present invention enables the grouping of the defects together so that they appear as a single defect during translation. For example, if five discrete defects occur in close proximity to one another, the group of defects can be mapped to occur between the end of one physical cylinder and the beginning of the next physical cylinder. In this manner, the group of discrete defects are essentially spanned or mapped out of the index table. The defects are thus transparent to controller 18.

Yet another advantage is to use disc drives and space more efficiently. The zone "Z" bit for each entry can be arbitrarily set to vary the number of sectors per cylinder from zone to zone. For example, the inner zone may be set to 30 sectors per cylinder, the middle zone may be set to 36 sectors, and the outer zone may be set to 44 sectors. Such an arrangement provides an efficient use of physical media space of the disc drive.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for accessing a physical memory location in a disc drive system, the system having a control unit, at least one magnetic storage disc having a plurality of physical memory locations with each of said physical memory locations being accessed by physical cylinder, head and sector numbers, and at least one magnetic head for accessing the physical memory locations, said method comprising steps of:
    A. receiving logic requests from a host processor, wherein each of said logic request includes a logic cylinder, a logic head and a logic sector, and wherein said logic cylinder, logic head and logic sector correspond to a physical cylinder, physical head and physical sector in said disc drive system respectively; and
    B. seeking said physical memory locations by said control unit, said seeking step including steps of:
        (a) storing an index table containing a set of logical cylinder memory location entries, wherein each of said logical cylinder memory location entries corresponds to a respective logic cylinder, and wherein each of said logical cylinder memory location entries contains a first parameter for indicating a respective physical cylinder arbitrarily located in said disc drive system;
        (b) identifying said respective physical cylinder by directly pointing to said respective physical cylinder in reference to said first parameter;
        (c) computing respective physical head and physical sector within said identified physical cylinder; and
        (d) wherein said host processor operates under a fixed number of sectors per track system and said control unit operates under variable numbers of sectors per track system, said method further comprising the steps of:
            storing a second parameter in said each of said logical cylinder memory location entries, said second parameter indicating a number of sectors in said identified physical cylinder, wherein said computing step computes said respective physical head and physical sector in reference to said second parameter and said logic head and logic sector.

2. The method of claim 1 further comprising the step of:
    storing a third parameter in said each of said logic cylinder memory location entries, said third parameter indicating defective status in said identified physical cylinder, wherein a first logic state of said third parameter indicates that at least one defective sector exists in said identified physical cylinder, and wherein a second logic state of said third parameter indicates that no defective sector exists in said identified physical cylinder.

3. The method of claim 2, said control unit further performing the step of:
    storing a defect table containing a sector offsetting entry containing an offsetting parameter;
    wherein said identifying step identifies said respective physical cylinder in reference to said first parameter and said offsetting parameter; and
    wherein said computing step computes said respective physical head and physical sector within said identified physical cylinder in reference to said second parameter and said offsetting parameter.

4. The method of claim 3, wherein said offsetting parameter including a cylinder push count, a head push count and a sector push count.

5. The method of claim 1, wherein said first parameter includes physical head location, physical cylinder location and physical sector location.

6. The method of claim 1, wherein logic cylinder zero (000) is physically mapped into into middle position of the disc drive system.

7. The method of claim 1, wherein said first, second, and third parameters can be arranged to adapt to different configurations of the disc drive system.

8. The method of claim 7, wherein said first, second, and third parameters can arranged to adapt defect patterns in physical cylinders of the disc drive system.

9. An apparatus for accessing a physical memory location in a disc drive system, the system having at least one magnetic storage disc having a plurality of physical memory locations with each of said physical memory locations being accessed by physical cylinder, head and sector numbers , and at least one magnetic head for accessing the physical memory locations, said apparatus comprising:
    A. means for receiving logic requests from a host processor, wherein each of said logic requests includes a logic cylinder, a logic head and a logic sector, and wherein said logic cylinder, logic head and logic sector corresponding to a physical cylinder, physical head and physical sector in said disc drive system respectively; and B. control unit for seeking said physical memory locations, said control unit including:
  (a) means for storing an index table containing a set of logical cylinder memory location entries, wherein each of said logical cylinder memory location entries corresponds to a respective logic cylinder, and wherein each of said logical cylinder memory location entries contains a first parameter for indicating a respective physical cylinder arbitrarily located in said disc drive system;
  (b) means for identifying said respective physical cylinder by directly pointing to said respective physical cylinder in reference to said first parameter;
  (c) means for computing respective physical head and physical sector within said identified physical cylinder; and
  (d) wherein said host processor operates under a fixed number of sectors per track system and said control unit operates under variable numbers of sectors per track system, said each of said logical cylinder memory location entries further comprising:
    a second parameter for indicating a number of sectors in said identified physical cylinder, wherein said means for computing computes said respective physical head and physical sector in reference to said second parameter and said logic head and logic sector.

10. The apparatus of claim 9, said each of said logical cylinder memory location entries further containing
  a third parameter for indicating defective status in said identified physical cylinder, wherein a first logic state of said third parameter indicates that at least one defective sector exists in said identified physical cylinder, and wherein a second logic state of said third parameter indicates that no defective sector exists in said identified physical cylinder.

11. The apparatus of claim 10, said control unit further comprising:
  means for storing a defect table containing a sector offsetting entry containing an offsetting parameter;
  wherein said identifying means identifies said respective physical cylinder in reference to said first parameter and said offsetting parameter; and
  wherein said computing means computes said respective physical head and physical sector within said identified physical cylinder in reference to said second parameter and said offsetting parameter.

12. The apparatus of claim 11, wherein said offsetting parameter includes a cylinder push count, a head push count and a sector push count.

13. The apparatus of claim 9, wherein said first parameter includes physical head location, physical cylinder location and physical sector location.

14. The apparatus of claim 9, wherein logic cylinder zero (000) is physically mapped into a middle position of the disc drive system.

15. The apparatus of claim 9, wherein said first, second, and third parameters can be arranged to adapt to different configurations of the disc drive system.

16. The apparatus of claim 15, wherein said first, second, and third parameters can be arranged to adapt to defect patterns in physical cylinders of the disc drive system.

* * * * *